US011111917B2

(12) United States Patent
Ota et al.

(10) Patent No.: US 11,111,917 B2
(45) Date of Patent: Sep. 7, 2021

(54) INTERNALLY ROTATING GEAR PUMP

(71) Applicant: DAIDO MACHINERY CORPORATION, Takatsuki (JP)

(72) Inventors: Yusuke Ota, Takatsuki (JP); Shoji Torii, Takatsuki (JP)

(73) Assignee: DAIDO MACHINERY CORPORATION, Takatsuki (JP)

( * ) Notice: Subject to any disclaimer, the term of this patent is extended or adjusted under 35 U.S.C. 154(b) by 201 days.

(21) Appl. No.: 16/339,974

(22) PCT Filed: Feb. 15, 2017

(86) PCT No.: PCT/JP2017/005540
§ 371 (c)(1),
(2) Date: Apr. 5, 2019

(87) PCT Pub. No.: WO2018/070062
PCT Pub. Date: Apr. 19, 2018

(65) Prior Publication Data
US 2019/0285067 A1    Sep. 19, 2019

(30) Foreign Application Priority Data

Oct. 11, 2016    (JP) .............................. JP2016-199700

(51) Int. Cl.
| | |
|---|---|
| F03C 2/00 | (2006.01) |
| F03C 4/00 | (2006.01) |
| F04C 2/00 | (2006.01) |
| F04C 2/10 | (2006.01) |
| F04C 2/08 | (2006.01) |
| F16H 55/08 | (2006.01) |

(52) U.S. Cl.
CPC .............. F04C 2/101 (2013.01); F04C 2/084 (2013.01); F04C 2/102 (2013.01);
(Continued)

(58) Field of Classification Search
CPC .......... F04C 2/084; F04C 2/101; F04C 2/102; F04C 2240/20; F04C 2240/56;
(Continued)

(56) References Cited

U.S. PATENT DOCUMENTS 1,503,362 A * 7/1924 Haight .................... F04C 2/101
418/169
1,700,818 A * 2/1929 Wilsey .................... F04C 2/101
418/169
(Continued)

FOREIGN PATENT DOCUMENTS

| DE | 2432180 A1 | 5/1976 |
|---|---|---|
| EP | 0517014 A1 | 12/1992 |

(Continued)

OTHER PUBLICATIONS

International Search Report for corresponding App. No. PCT/JP2017/005540, dated Apr. 11, 2017.

*Primary Examiner* — Theresa Trieu
(74) *Attorney, Agent, or Firm* — Renner, Otto, Boisselle & Sklar, LLP

(57) ABSTRACT

In an internally rotating gear pump, a pinion having external teeth and a gear having internal teeth are housed in a casing. The pinion and the gear rotate while the internal teeth and the external teeth are meshed with each other. The pinion is a driving gear that is coupled to a rotating shaft receiving a rotating force from an external motor, such that the pinion and the rotating shaft are rotationally driven in an integrated manner when the rotating shaft is driven. The gear is a driven gear, and is rotatably supported on a gear pin provided to the casing via a gear bush serving as a slide bearing.

7 Claims, 20 Drawing Sheets

(52) U.S. Cl.
CPC ...... *F04C 2240/20* (2013.01); *F04C 2240/56* (2013.01); *F04C 2250/20* (2013.01); *F16H 55/08* (2013.01)

(58) Field of Classification Search
CPC ...... F04C 2250/20; F16H 55/08; F16H 48/14; F16H 15/40; F05C 2201/0436; F05C 2201/0478
See application file for complete search history.

(56) References Cited

U.S. PATENT DOCUMENTS

| | | | | |
|---|---|---|---|---|
| 1,719,639 | A | * | 7/1929 | Wilsey ................ F04C 2/101 418/169 |
| 2,482,713 | A | * | 9/1949 | Jones ................. F04C 2/101 418/170 |
| 4,155,686 | A | | 5/1979 | Eisenmann et al. |
| 4,778,363 | A | * | 10/1988 | Buchmuller .......... F04C 2/101 418/170 |
| 5,395,217 | A | | 3/1995 | Hoffmann et al. |
| 5,618,171 | A | * | 4/1997 | von Behr ............. F04C 2/082 418/152 |
| 5,820,504 | A | * | 10/1998 | Geralde .............. F16H 48/12 475/177 |
| 6,158,994 | A | | 12/2000 | Mulcahy |
| 2012/0148426 | A1 | * | 6/2012 | Bodzak ............... F04C 2/086 418/171 |

FOREIGN PATENT DOCUMENTS

| | | |
|---|---|---|
| JP | 09-060594 A | 3/1997 |
| JP | 2015-214965 A | 12/2015 |

\* cited by examiner

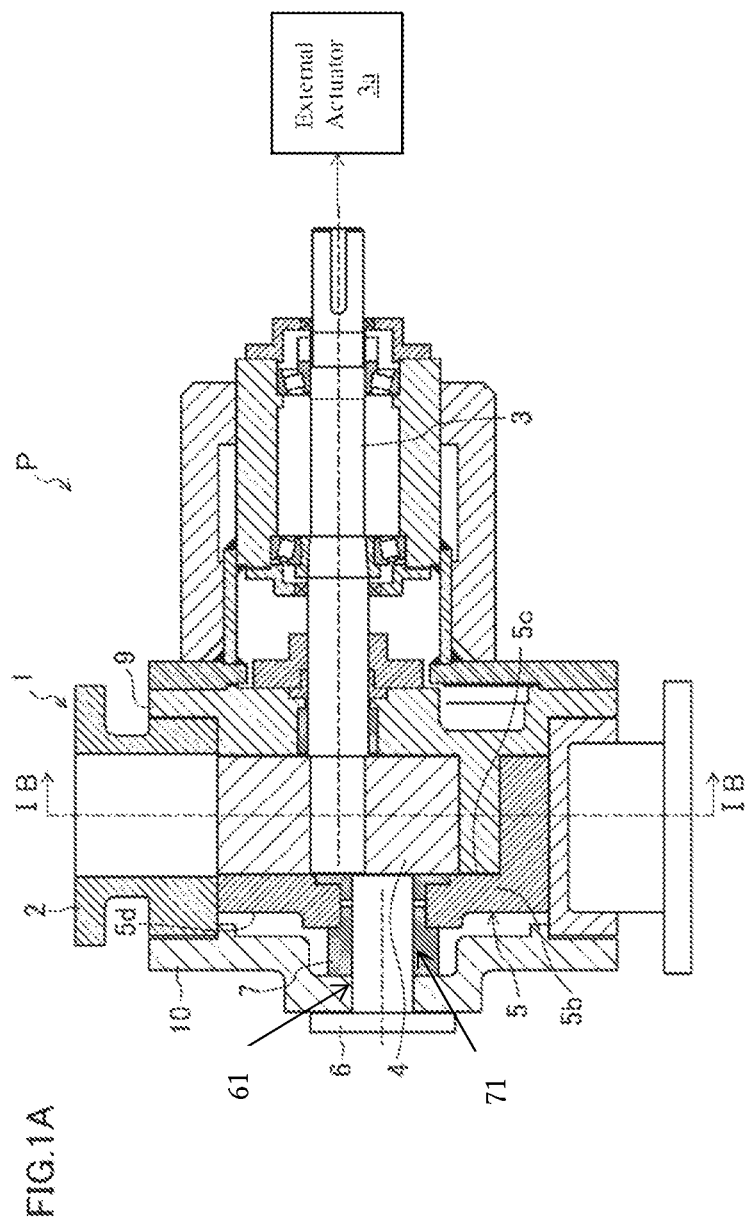

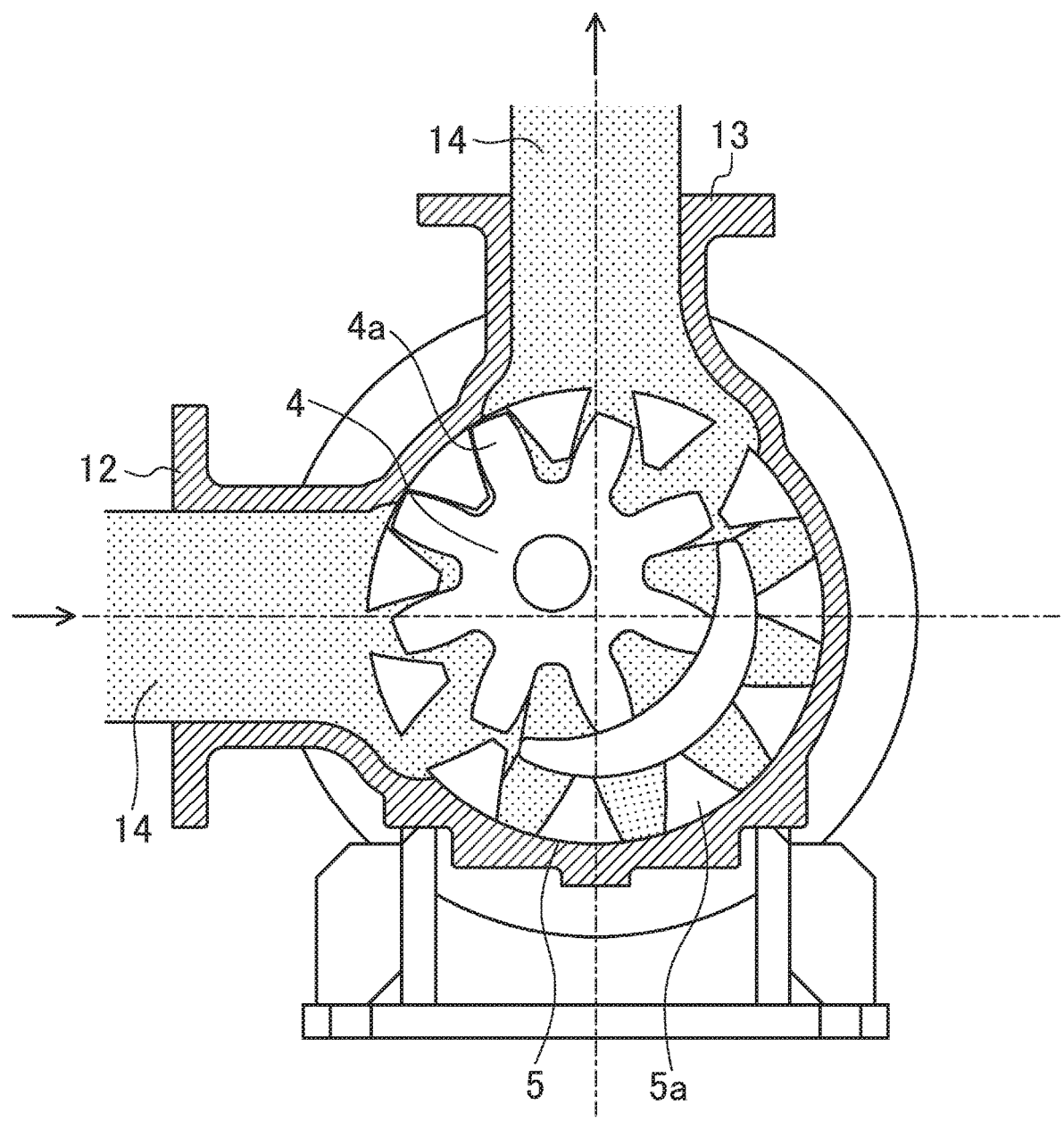

RADIUS OF PITCH CIRCLE OF PINION

RADIUS OF PITCH CIRCLE OF GEAR

OUTER RADIUS OF GEAR

INTERNALLY ROTATING GEAR PUMP

TECHNICAL FIELD

The present disclosure relates to an internally rotating gear pump that sucks and discharges a fluid by rotating an external gear and an internal gear in a casing while the external and internal gears are meshed with each other.

BACKGROUND ART

An internally rotating gear pump has been generally known which includes a casing that houses a driving gear, a driven gear having a rotation axis eccentric to the driving gear and meshed with the driving gear, and a crescent-shaped guide provided between the driving gear and the driven gear. The internally rotating gear pump sucks and discharges a fluid by rotating, with a motor or the like, the driving gear and the driven gear meshed with the driving gear (for example, see Patent Documents 1 and 2).

Furthermore, Patent Document 2 discloses an example in which when the outward tooth surfaces of adjacent internal teeth of a gear (an internal gear), which is a driving gear, are arc tooth surfaces constituting a part of the same circle, the shape of a meshing surface between the internal teeth of the gear and the external teeth of a pinion (an external gear) that is a driven gear is theoretically derived.

CITATION LIST

Patent Documents

Patent Document 1: Japanese Unexamined Patent Publication No. 2015-214965
Patent Document 2: Japanese Unexamined Patent Publication No. H09-60594

SUMMARY OF THE INVENTION

Technical Problem

In recent years, the internally rotating gear pumps have been increasingly used to transfer a fluid with a viscosity much lower than that of water and a fluid with a high viscosity such as a semisolid, in addition to a fluid having a predetermined viscosity as in the case of a hydraulic pump. Furthermore, the fluid itself to be transferred is not limited to a single material. A mixture of a plurality of materials, such as resin mixed with slurry has been increasingly transferred by the internally rotating gear pumps.

However, when a fluid with a high viscosity or mixed with solids is transferred using the internally rotating gear pump, a load on the pump, particularly, a load to parts of a rotary unit such as a gear increases, resulting in impairment of the durability of the pump itself.

The present invention has been made in view of the foregoing background, and an object of the present invention is to provide an internally rotating gear pump capable of transferring fluids with various viscosities, fluids containing solids, and fluids of any other type, and having an excellent durability.

Solution to the Problem

In order to achieve the above object, in the present invention, a pinion is used as a driving gear, a gear having internal teeth is used as a driven gear, and the gear is rotatably supported on a gear pin provided at a casing via a gear bush functioning as a slide bearing.

Specifically, an internally rotating gear pump of the present invention is an internally rotating gear pump in which a pinion having external teeth and a gear arranged eccentrically to the pinion and having internal teeth meshed with the external teeth of the pinion are housed in a casing having a suction port and a discharge port, the internally rotating gear pump being configured to suck a fluid and discharge the fluid by rotating the pinion and the gear while the internal teeth and the external teeth are meshed with each other. The internally rotating gear pump includes: a rotating shaft rotatably supported in the casing and rotationally driven by an external actuator; and a gear pin provided to the casing. The pinion is coupled to the rotating shaft such that the pinion and the rotating shaft are rotationally driven in an integrated manner when the rotating shaft is driven, and the gear is rotatably supported on the gear pin via a gear bush functioning as a slide bearing.

This configuration, in which the use of the pinion as a driving gear makes it possible to reduce a load acting on the gear bush functioning as a slide bearing, can prolong the lifetime of the gear bush and improve the durability of the pump.

Preferably, the gear has m internal teeth (m is a natural number equal to or greater than 3). Among the m internal teeth, inward tooth surfaces of two internal teeth between which n consecutive internal teeth ($m/2<n<m$; n is a natural number) are interposed are positioned on an arc of an identical circle, the pinion has o external teeth ($o<m$; o is a natural number), and a theoretical tooth surface of the external teeth is configured such that, while a trajectory of contact points between the gear and the pinion when the gear is rotated around a rotation center Og of the gear in increments of a predetermined angle is defined as CP, the theoretical tooth surface coincides with a trajectory obtained by rotating the trajectory CP around a rotation center Op of the pinion in a direction opposite to a rotation direction of the gear in increments of an angle obtained by multiplying an inverse ratio ($m/o$) of a gear ratio between the gear and the pinion by the predetermined angle.

With this configuration, the internal teeth of the gear and the external teeth of the pinion are meshed with each other more smoothly than the gear of known art. In addition, a ratio between an outer diameter and an inner diameter of the gear is increased, enabling an increase in a discharge amount of the pump.

Preferably, a tooth surface of the external teeth for practical use is a shape obtained through a combination of a plurality of arcs approximating the theoretical tooth surface.

This feature makes the design of a tooth surface of the external teeth of the pinion easy.

Preferably, the gear has the internal teeth provided on an outer peripheral part of a gear base of the gear, the gear bush protrudes toward the pinion by a predetermined protrusion length from the gear base, and the gear base and the pinion are arranged at a distance from each other, the distance being longer than the protrusion length.

This configuration can reduce abrasion which may be caused by contact between the gear and the pinion during the rotation of them. Consequently, this configuration can increase the lifetime of the gear and thus the durability of the pump.

Preferably, the gear base is provided with a sleeve on a side facing away from the pinion, the sleeve usable for adjusting a position of the gear bush along a rotation axis of the rotating shaft.

With this configuration, even when the gear bush is abraded, the protrusion length of the gear bush can be corrected through adjustment of a positional relation between the sleeve and the gear. As a result a distance between the gear and the pinion is maintained as appropriate so that a scratch or abrasion which may be caused by contact between the gear and the pinion can be substantially prevented, contributing to improving the durability of the pump. In addition, this configuration can reduce exchange frequency of the gear bush.

Preferably, the pinion includes an iron-based material, and the gear bush consists of any one of a gunmetal-based material, a carbon-based material, a silicon carbide, or a composite material of a carbon-based material and a silicon carbide.

This configuration makes it less likely that a surface of the pinion, which faces the gear bush, is scratched, thereby enabling prolongation of the lifetime of the pinion.

Advantages of the Invention

As described above, according to the present invention, the durability of the internally rotating gear pump can be improved by reducing abrasion of parts of a rotary unit such as a gear.

BRIEF DESCRIPTION OF THE DRAWINGS

FIG. 1A is a cross-sectional view of an internally rotating gear pump according to an embodiment of the present invention.

FIG. 2 is a view for explaining an operation of the internally rotating gear pump.

DESCRIPTION OF EMBODIMENTS

Embodiments of the present invention will be described in detail below with reference to the drawings. The following description of preferred embodiments is merely exemplary in nature, and is not intended to limit the scope, application, and uses of the present invention.

(Structure and Operation of Internally Rotating Gear Pump)

Figure 1B:
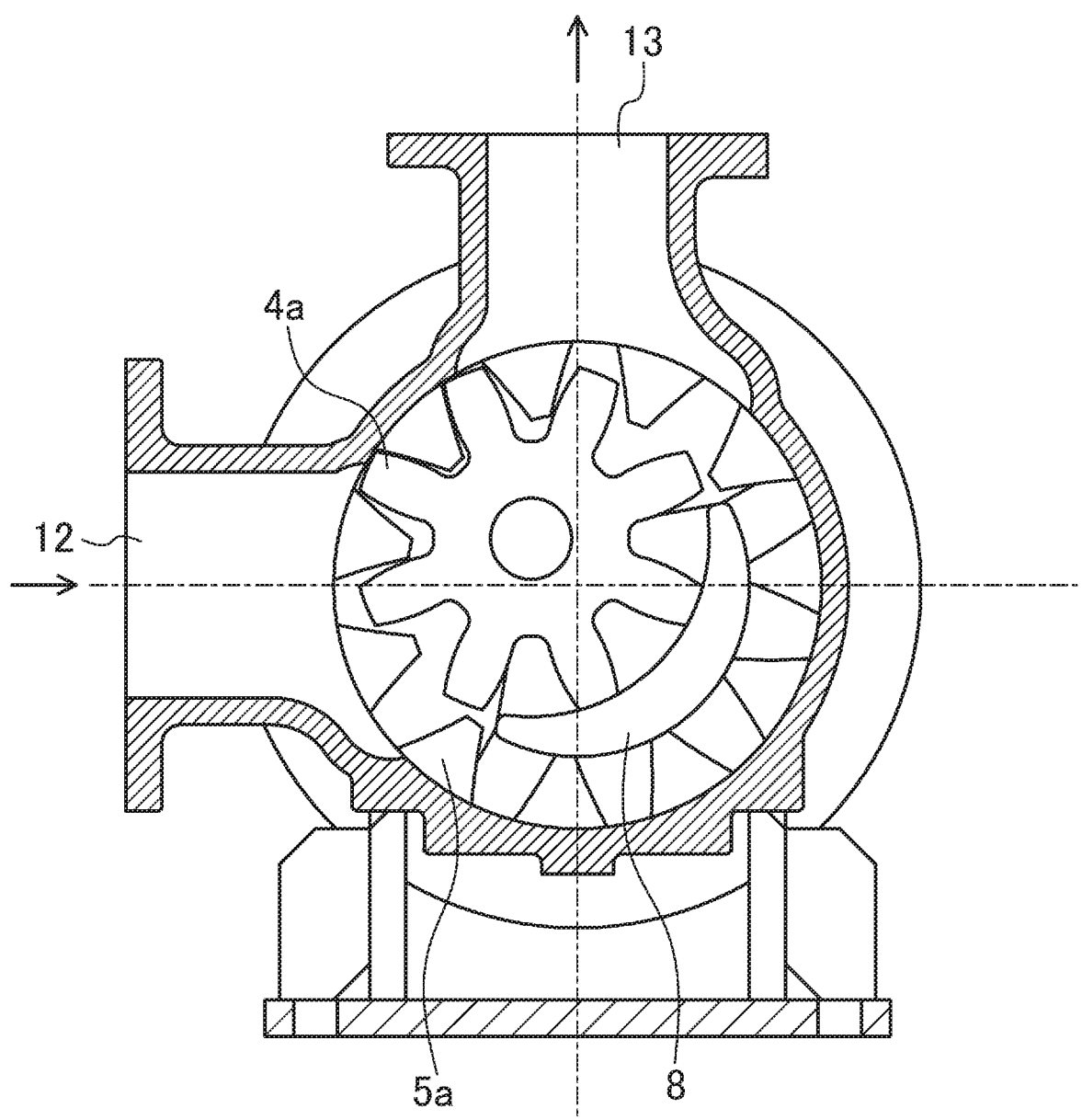
FIG. 1B is a cross-sectional view taken along line IB-IB of FIG. 1A.

FIG. 1A and FIG. 1B illustrate an internally rotating gear pump P according to an embodiment of the present invention. The internally rotating gear pump P includes a casing 1 that includes a casing body 2, a casing cover 9, and an end cover 10. The casing cover 9 and the end cover 10 seal the casing body 2, thereby defining a sealed space in the casing 1. The casing body 2 has a suction port 12 through which a fluid is sucked into the casing 1 and a discharge port 13 through which the fluid is discharged out of the casing 1. The suction port 12 and the discharge port 13 are arranged at an angular interval of 90° with respect to a rotation axis of a gear 5, which will be described below.

The casing 1 houses a pinion 4, which is a driving gear having external teeth 4a, and the gear 5 which is a driven gear arranged eccentrically to the pinion 4. The gear 5 is substantially in the shape of a bottomed cylinder and has internal teeth 5a, some of which mesh with some of the external teeth 4a of the pinion 4.

The casing cover 9 constitutes a cover close to the pinion 4. A rotating shaft 3 that is rotationally driven by receiving a rotational force from a motor (an external actuator 3a shown in FIG. 1A) airtightly passes through the casing cover 9. The rotating shaft 3 has an end portion located in the casing 1 and inserted in, and coupled to, the pinion 4 such that the pinion 4 and the rotating shaft 3 are rotationally driven in an integrated manner when the rotating shaft 3 is driven.

Furthermore, the casing cover 9 is provided therein with a guide 8 that protrudes into the casing 1. The guide 8 has a crescent shape and is arranged between tooth tips of the external teeth 4a of the pinion 4 and tooth tips of the internal teeth 5a of the gear 5.

The end cover 10 constitutes a cover close to the gear 5. A gear pin 6 extending parallel to the rotating shaft 3 is fixedly mounted to the end cover 10 at a position eccentric to the rotating shaft 3. Specifically, the gear pin 6 airtightly passes through the end cover 10 so that an inner end portion of the gear pin 6 protrudes into the casing 1. The gear pin 6 passes through, and rotatably supports, the gear 5 via a cylindrical gear bush 7. The gear bush 7 functions as a slide bearing between the gear pin 6 fixedly mounted to the end cover 10 and the gear 5 rotating around the gear pin 6. The gear bush 7 is formed in a hollow cylindrical shape and the gear pin 6 is formed in a columnar shape. The gear bush 7 is fitted onto the gear pin 6, and a whole of an inner peripheral surface 71 of the gear bush 7 is in contact with an outer peripheral surface 61 of the gear pin 6.

Hereinafter, unless otherwise specifically stated, "front" refers to a side where the casing cover 9 is arranged (the right side in FIG. 1A) when viewed in a direction perpendicular to the rotating shaft 3 and "rear" refers to the opposite side, that is, a side where the end cover 10 is arranged (the left side in FIG. 1A).

Figure 5:
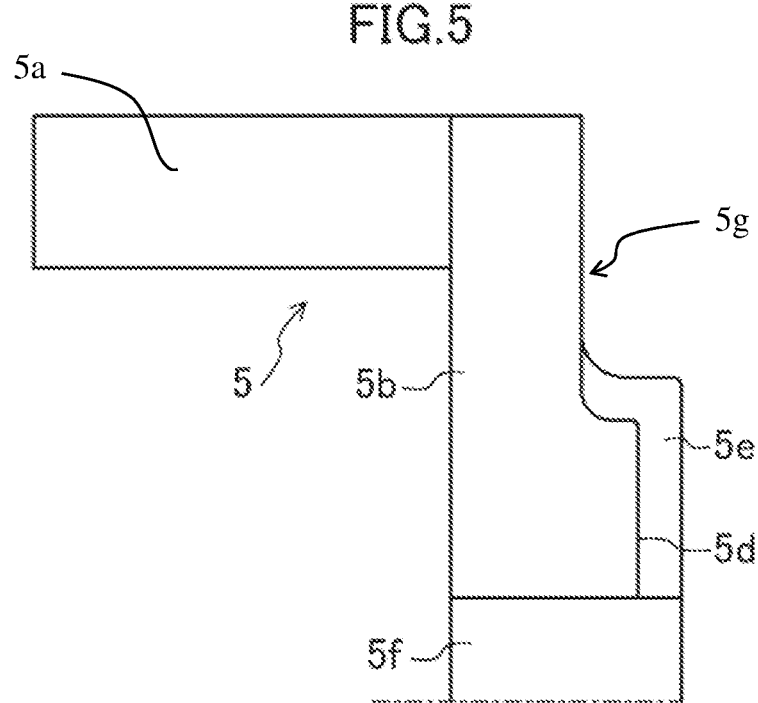
FIG. 5 is a cross-sectional view of an upper half of the gear when the shape of a gear boss is changed.

The gear 5 has a disc-shaped base 5b and a mounting hole 5f (see FIGS. 3 and 5) formed through a central portion of the base 5b. The base 5b has a front surface 5c facing the pinion 4. The plurality of internal teeth 5a protrude from an outer peripheral portion 5g of the front surface 5c at predetermined angular intervals to form a ring shape. Furthermore, the base 5b has a rear surface 5d facing away from the pinion 4. A cylindrical sleeve 11 (see FIG. 17), 5 which is inserted into the mounting hole 5f, is mounted to the rear surface 5d. The gear bush 7 is arranged to be interposed between the gear pin 6 and the sleeve 11. Note that the gear bush 7 may be directly mounted to the gear 5.

This embodiment is based on an assumption that the number of the external teeth 4a is 8 and the number of the internal teeth 5a is 11. However, the numbers of the external and internal teeth are appropriately changed in accordance with design conditions and the like of the pump, and are not limited to the aforementioned values.

As illustrated in FIG. 2, the pinion 4 and the gear 5 are rotationally driven by the rotating shaft 3 while some of the external teeth 4a of the pinion 4 are meshed with some of the internal teeth 5a of the gear 5, so that a fluid sucked through the suction port 12 into the casing 1 is discharged through the discharge port 13. Specifically, the rotating shaft 3 is rotated by the motor or the like, and consequently, the pinion 4 is rotationally driven by the rotating shaft 3. At this time, the gear 5 whose internal teeth 5a are meshed with the external teeth 4a of the pinion 4 receives a torque, and thus, is rotated around the gear pin 6.

Since the fluid 14 is sucked through the suction port 12 in the state where some of the external teeth 4a and some of the internal teeth 5a are meshed with each other, the fluid 14 is not allowed to leak to the discharge port 13.

As the pinion 4 and the gear 5 rotate, the mesh between the external teeth 4a and the internal teeth 5a is released, so that the fluid 14 that has been sucked through the suction port 12 is confined in a space defined by an inward surface of the guide 8, the tooth spaces of the external teeth 4a, the base 5b of the gear 5, and the casing cover 9 and is moved along the guide 8. At the same time, the fluid 14 is also confined in a space defined by an outward surface of the guide 8, the tooth spaces of the internal teeth 5a, the base 5b of the gear 5, and the casing cover 9 and is moved in the same manner. The fluid 14 in both spaces is conveyed toward the discharge port 13 along with the rotation of the pinion 4 and the gear 5.

When the pinion 4 and the gear 5 rotate further, the external teeth 4a and the internal teeth 5a are meshed with each other again, so that the fluid 14 in the respective spaces is discharged through the discharge port 13.

When the external teeth 4a and the internal teeth 5a are completely meshed with each other, the fluid 14 is blocked by these teeth 4a and 5a, the base 5b of the gear 5, and the casing cover 9. Therefore, the fluid 14 is not conveyed beyond the discharge port 13 and is not allowed to flow back to the suction port 12.

(Pinion Drive System)

In general, during an operation of an internally rotating gear pump, a bush provided to a driven gear is within a fluid and in contact with the fluid.

As described earlier, since fluids to be transferred have different viscosities and contain different types of solid in different amounts, the bush, which is in contact with the fluid when the pump is rotating, is likely to be subjected to abrasion.

To address this issue, this embodiment employs a pinion drive system in which the pinion 4 rotates as a driving gear, instead of the known gear drive system disclosed in Patent Document 2 in which the gear 5 rotates as a driving gear.

Figure 7:
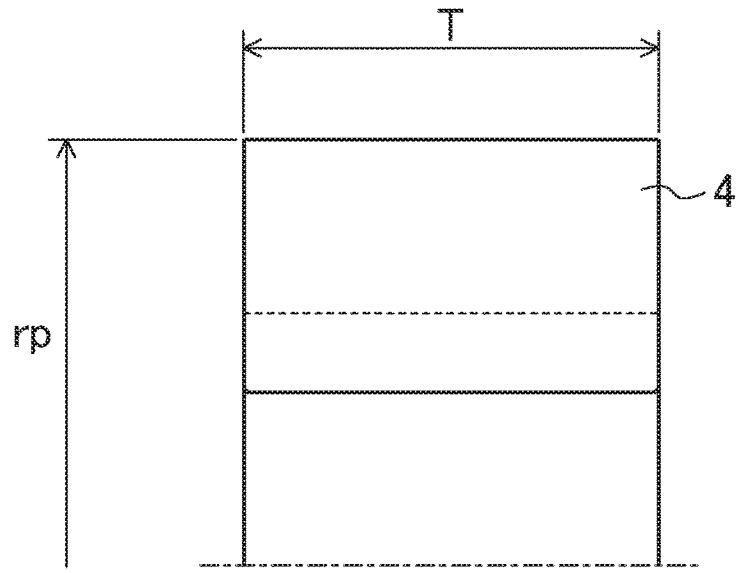
FIG. 7 is a cross-sectional view of an upper half of the pinion.

First, loads acting on the gear 5 and the pinion 4 will be described. A load Fp acting on the pinion 4 illustrated in FIG. 7 is expressed by the following formula (1):

$$Fp = rp \times P \times T \quad (1)$$

In the above formula (1), rp represents an outer radius of the pinion 4, P represents a differential pressure between a suction pressure and a discharge pressure, and T represents a thickness (a facewidth) of the pinion 4 along the rotation axis.

Figure 4:
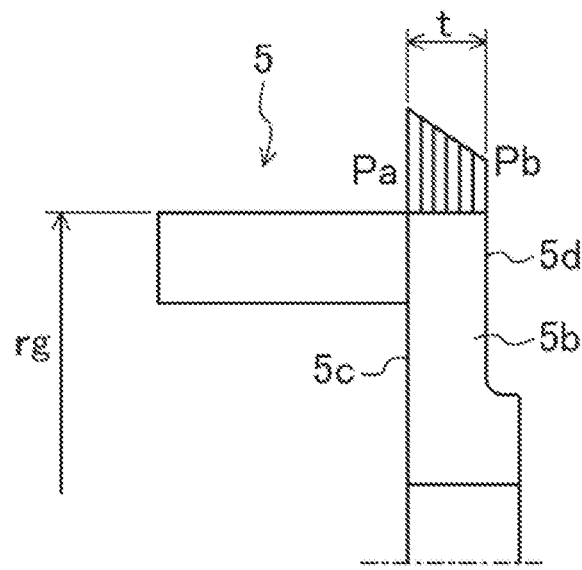
FIG. 4 is a cross-sectional view of an upper half of the gear.

On the other hand, a load Fg acting on the gear 5 illustrated in FIG. 4 is approximately expressed by the following formula (2):

$$Fg = rg \times P \times t/2 \quad (2)$$

In the above formula (2), rg represents an outer radius of the gear 5 and t represents a thickness of the base 5b along the rotation axis.

For the gear 5, the differential pressure P is applied to the base 5b and corresponds to a difference between a pressure Pa applied to the front surface 5c and a pressure Pb applied to the rear surface 5d.

The ratio between the outer radius of the pinion 4 and that of the gear 5 depends on a gear ratio.

In this embodiment, since the number o of teeth of the pinion 4 is 8 and the number m of teeth of the gear 5 is 11, the gear ratio o/m is 8/11. Furthermore, if the ratio between the thickness T of the pinion 4 along the rotation axis and the thickness t of the base 5b of the gear 5 along the rotation axis ranges from 0.3 to 0.4, the ratio Fg/Fp between the load Fg expressed by the above formula (2) and the load Fp expressed by the above formula (1) ranges from 0.2 to 0.275.

Accordingly, the load Fg acting on the gear corresponds to about ⅕ to about ¼ of the load Fp acting on the pinion.

Since the load Fg expressed by the above formula (2) also acts on the gear bush 7, a load applied to a bush is smaller in the pinion drive system in which the bush being in contact with a fluid is provided to the gear 5 than in the gear drive system in which the bush being in contact with a fluid is provided to the pinion 4. For this reason, the lifetime of the gear bush 7 is prolonged and the durability of the entire pump P is increased.

Furthermore, the pinion drive system makes it possible to reduce a transmission torque received from the motor.

In general, when a transmission torque from a motor to a rotating shaft increases, it is necessary to increase fastening force between the rotating shaft and a gear couple to the rotating shaft.

In a case where the rotating shaft and the gear are fastened together with screws, the strength of the screws limits the fastening force. Therefore, in many cases, the rotating shaft and the gear are fastened together by shrink fitting when an increase in a transmission torque is desired. The shrink fitting is a method in which a gear is heated and expanded to widen the diameter of a hole of the gear, the rotating shaft is then fitted into the hole in such a state, and the gear is cooled to contract so as to be firmly fixed.

The fastening force achieved by the shrink fitting depends on a pressure received by the rotating shaft from the gear and a contact area between the rotating shaft and the gear.

In the case of the gear drive system, the base 5b of the gear 5 cannot be made thicker than necessary because such a large thickness of the base 5b results in an adverse increase in the load applied to the motor. Accordingly, it is necessary to increase the fastening force between the rotating shaft 3 and the gear 5 by increasing the contact area therebetween. Such increase in the contact area is achieved by increasing the diameter of the rotating shaft 3, or changing the shape of the gear 5 through provision of, for example, a gear boss 5e illustrated in FIG. 5 to increase the diameter or the length of the mounting hole of the gear 5.

However, all the foregoing measures cause an increase in the size of the device and in the material cost.

In contrast, in the pinion drive system, the entire inner surface of a mounting hole 4c formed in the pinion 4 is in contact with the rotating shaft 3. Unlike the gear drive system, the pinion drive system eliminates the need to correct the dimension of the rotating shaft 3 and the need to provide the gear boss 5e. Thus, the pinion drive system is advantageous in terms of design and cost.

With the assumption that the mounting hole 5f of the gear in the gear drive system and the mounting hole 4c of the pinion in the pinion drive system have the same diameter, the transmission torques of the mounting holes 5f and 4c have been calculated. It has been found that the torque transmitted by the latter is about 1.13 times to about 1.7 times as large as that transmitted by the former. This difference is mainly caused by a difference between the thickness of the base 5b of the gear 5 and the facewidth of the pinion 4.

Furthermore, with the pinion drive system, a mechanism for rotating the rotating shaft 3 can be simplified and the cost for the mechanism can be reduced.

Using the aforementioned gear ratio, if the gear 5 rotates at 100 rpm, the rotational speed of the pinion 4 is calculated to be 140 rpm. If a workload is kept unchanged, a rotational torque decreases with increase in a rotational speed. Therefore, the rotational torque of the rotating shaft 3 is smaller in the pinion drive system than the gear drive system.

Accordingly, in a case where the rotating force is transmitted from the motor to the rotating shaft 3 via a speed reducer, the speed reducer can be a simple one which has a small reduction ratio, that is, a small rotational torque.

(Tooth Surface Design of Pinion and Gear)

The durability of the internally rotating gear pump P having the pinion drive system described above can be further increased by smoothing the mesh between the external teeth 4a of the pinion 4 and the internal teeth 5a of the gear 5.

In view of this, in this embodiment, each of the internal teeth 5a of the gear 5 has an inverted shape of the arc shape disclosed in Patent Document 2. In addition, the tooth surface of the internal teeth 5a of the gear 5 and the tooth surface of the external teeth 4a of the pinion 4 corresponding to the internal teeth 5a of the gear 5 are designed as will be described below. These features make it possible to mesh the pinion and the gear of this embodiment more smoothly than those of the known internally rotating gear pump.

(Design of Tooth Surface of Gear)

Figure 3:
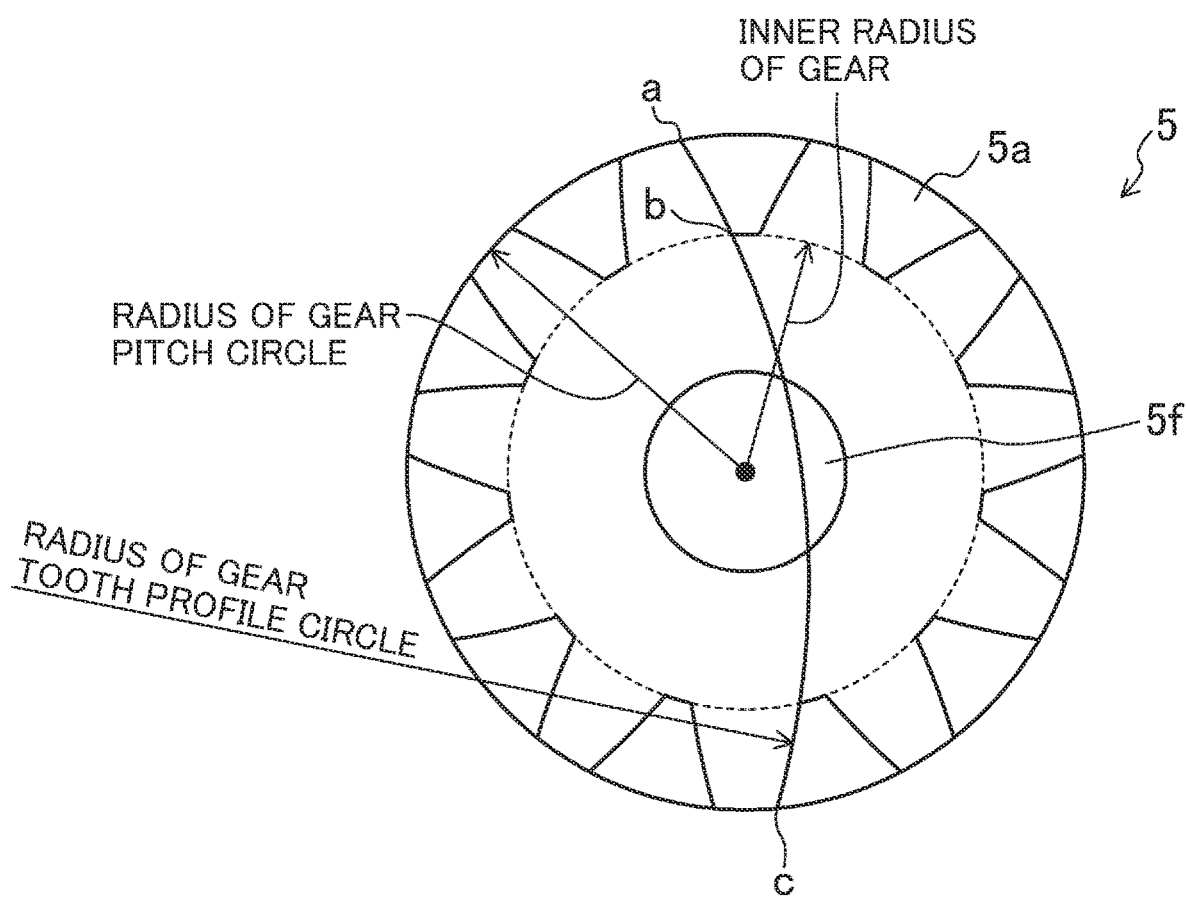
FIG. 3 illustrates a gear as viewed in an axial direction.

As illustrated in FIG. 3, the internal teeth 5a of the gear 5 are designed to form an arc passing through one point (the point a in FIG. 3) on a pitch circle of the gear 5, one point (the point b in FIG. 3) on a dedendum circle of the gear 5, and a point c in FIG. 3.

Figure 8:
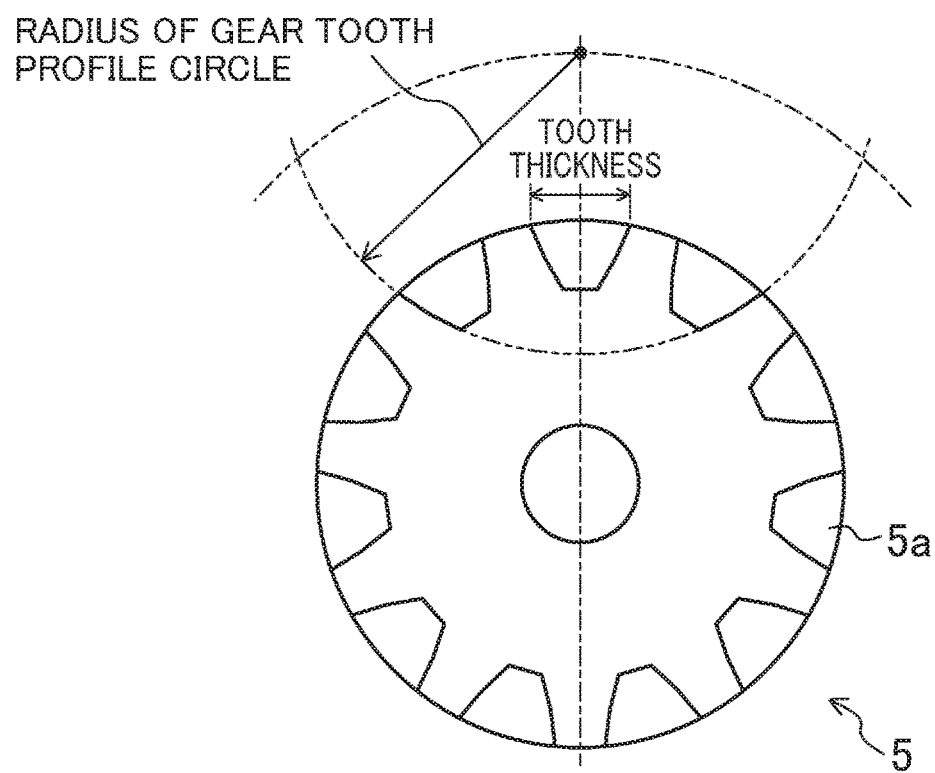
FIG. 8 illustrates a known gear as viewed in an axial direction.

The orientation of this arc is opposite to that of the internal teeth of the known gear illustrated in FIG. 8. In other words, the arc has an inverted arc shape.

The dedendum circle of the gear 5 refers to a circle whose center coincides with the center of rotation Op of the gear 5 and whose radius coincides with the inner radius of the gear 5.

Here, to determine the point c of FIG. 3, balance with the tooth tip shape of the pinion 4 is important.

In actual design of the tooth surface of the pinion 4, the dedendum shape is typically designed by connecting adjacent external teeth 4a to each other with an arc. In this case, in view of the ease of machining, the radius of the arc is preferably designed to be large.

On the other hand, taking account of a load received by the external teeth 4a of the pinion 4 during the rotation of the pump, it is advantageous, in terms of strength, to increase the thickness d of the dedendum of the external teeth 4a.

In actual design, importance is placed on the strength of the external teeth 4a. In general, when the number of the internal teeth 5a of the gear 5 is m (m is a natural number equal to or larger than 3), it is suitable that the inward tooth surfaces of two internal teeth between which n consecutive internal teeth (m/2<n<m; n is a natural number) are interposed are positioned on the same arc.

Figure 11A:
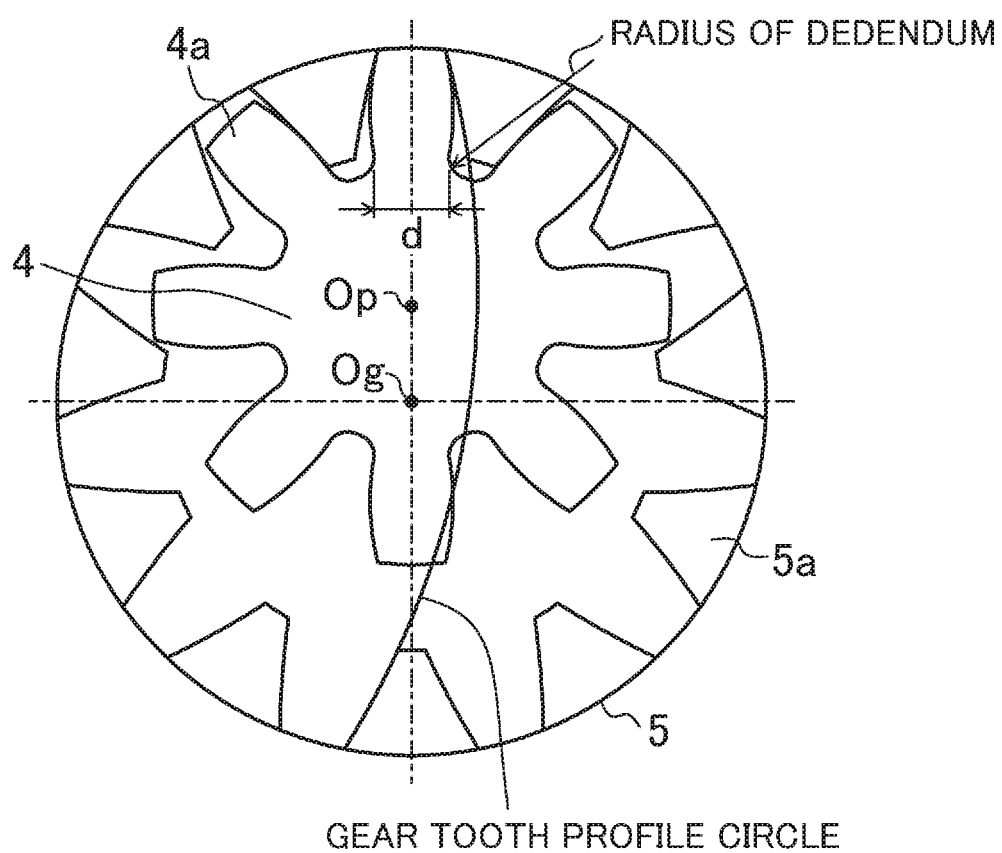
FIG. 11A illustrates the shapes of a gear and a pinion in a case where the inward tooth surfaces of two internal teeth between which five consecutive internal teeth are interposed are positioned on an arc of the same circle.
Figure 11B:
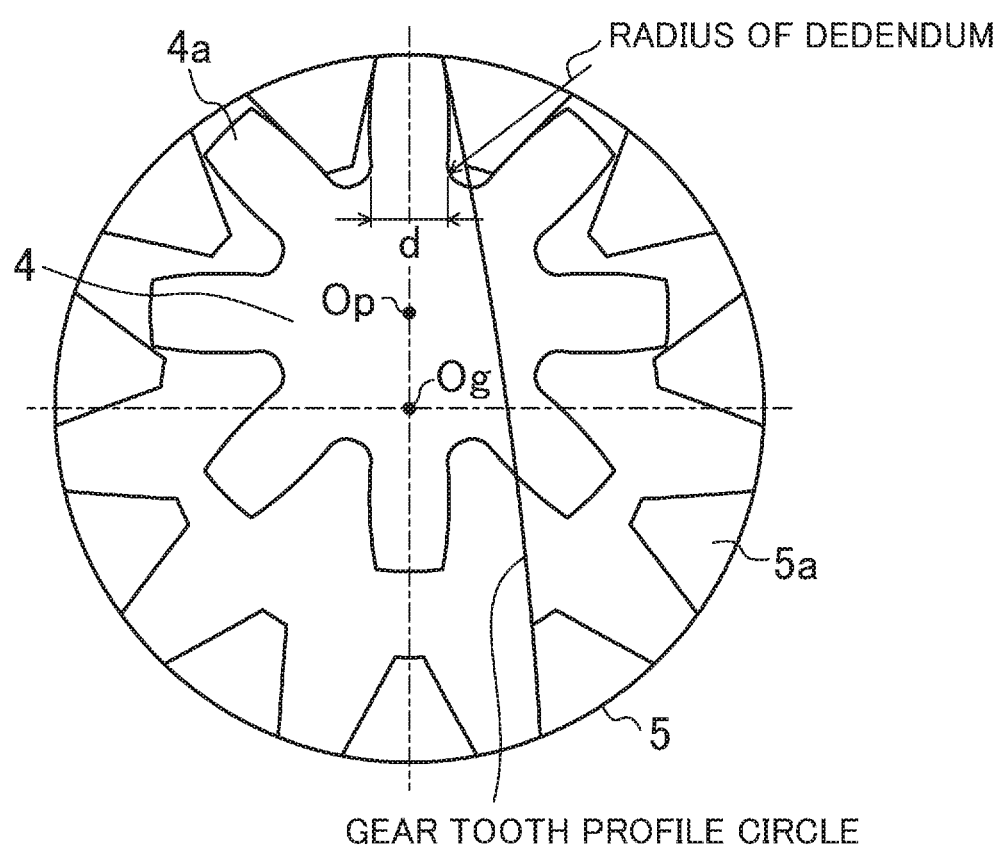
FIG. 11B illustrates the shapes of a gear and a pinion in a case where the inward tooth surfaces of two internal teeth between which six consecutive internal teeth are interposed are positioned on an arc of the same circle.
Figure 11C:
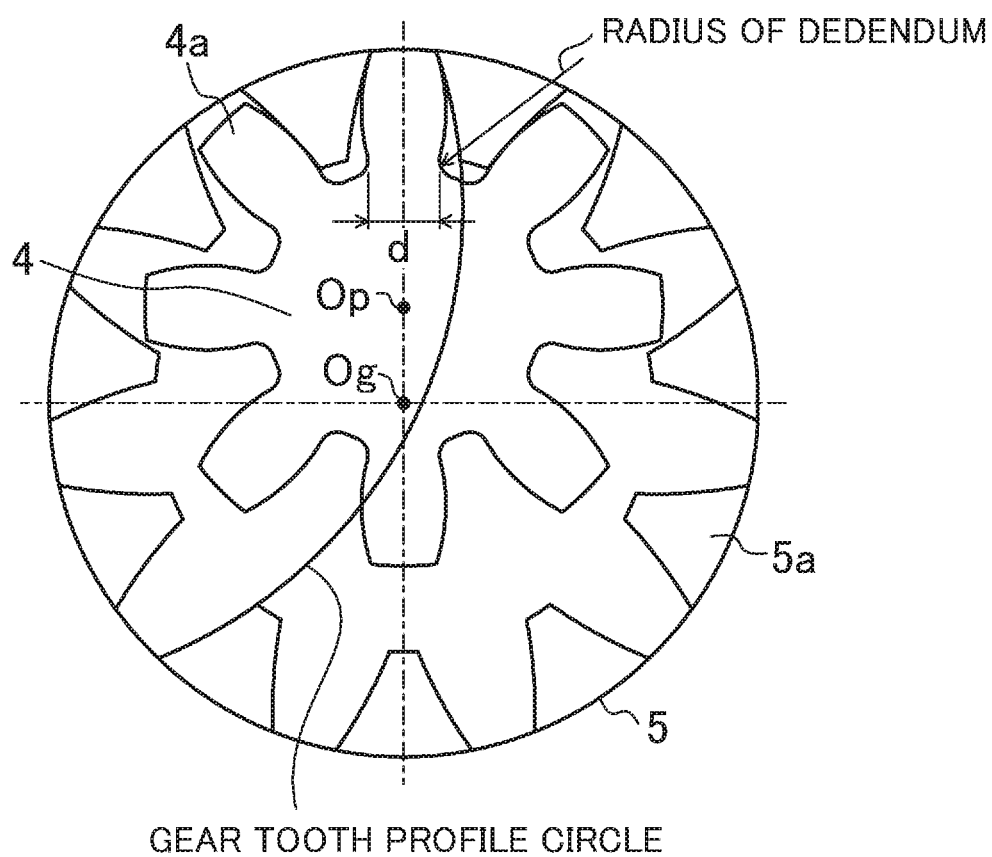
FIG. 11C illustrates the shapes of a gear and a pinion in a case where the inward tooth surfaces of two internal teeth between which four consecutive internal teeth are interposed are positioned on an arc of the same circle.
Figure 12:
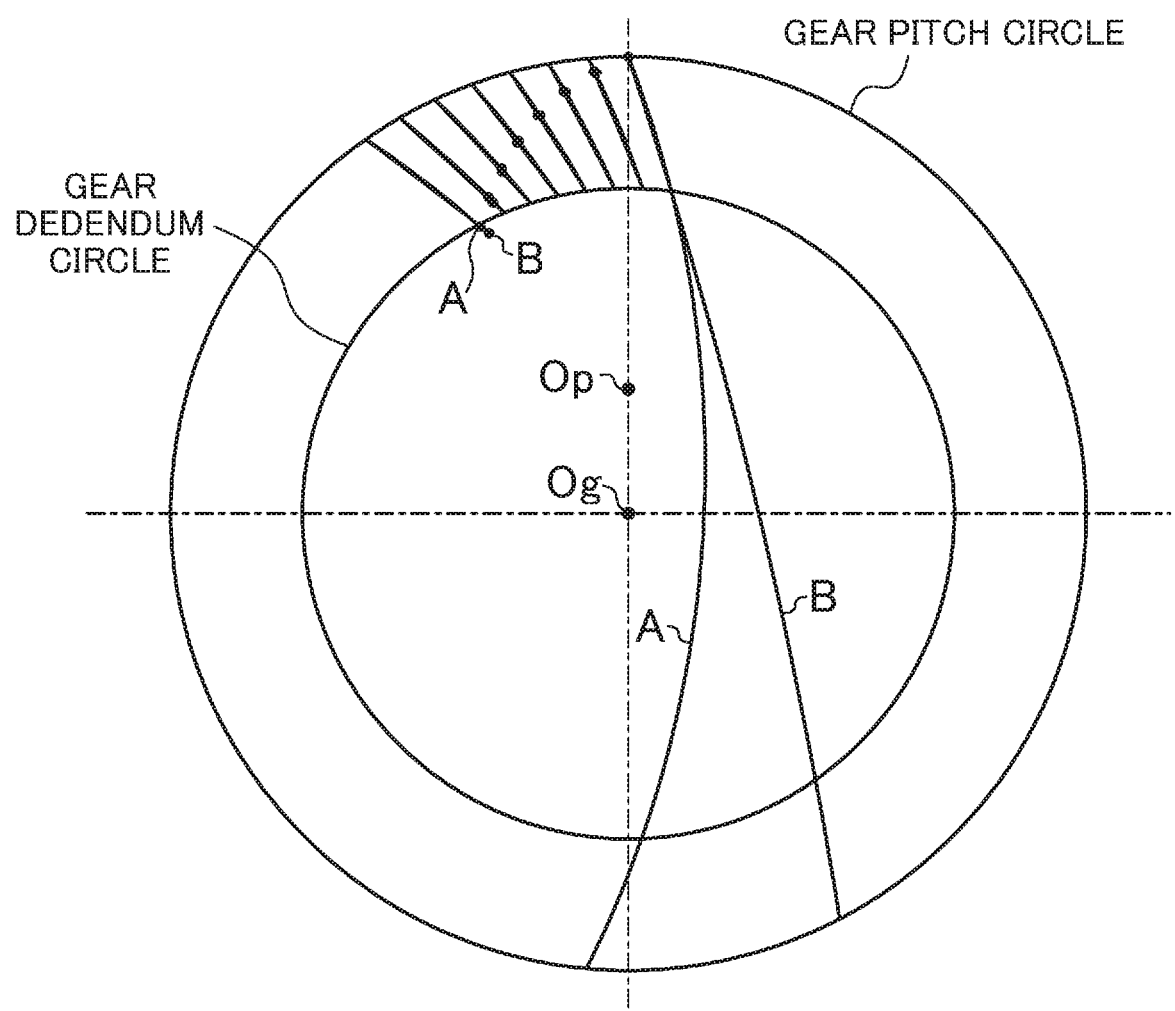
FIG. 12 illustrates the trajectory of contact points between the gear and the pinion illustrated in FIG. 11A and the trajectory of contact points between the gear and the pinion illustrated in FIG. 11B.

With the foregoing taken into account, the configuration illustrated in FIG. 11C is not so suitable for practical use since the strength of the pinion 4 is weaker than that of the other two configurations. Furthermore, as illustrated in FIG. 12, the trajectory A of contact points between the gear 5 and the pinion 4 illustrated in FIG. 11A curves more gradually with respect to the radial direction of the gear 5 than the trajectory B of contact points of the case illustrated in FIG. 11B. This means that the gear 5 and pinion 4 illustrated in FIG. 11A come into contact with each other smoothly.

Thus, an optimal shape in this embodiment is represented by the configuration illustrated in FIG. 11A, in which the inward tooth surfaces of two internal teeth between which five consecutive internal teeth are interposed are positioned on the arc of the same circle.

In the designs illustrated in FIGS. 11A to 11C, the number o of teeth of the pinion 4 is 8 and the number m of teeth of the gear 5 is 11, as described above.

(Design of Tooth Surface of Pinion)

The theoretical tooth surface of the pinion 4 is obtained as follows.

Figure 13A:
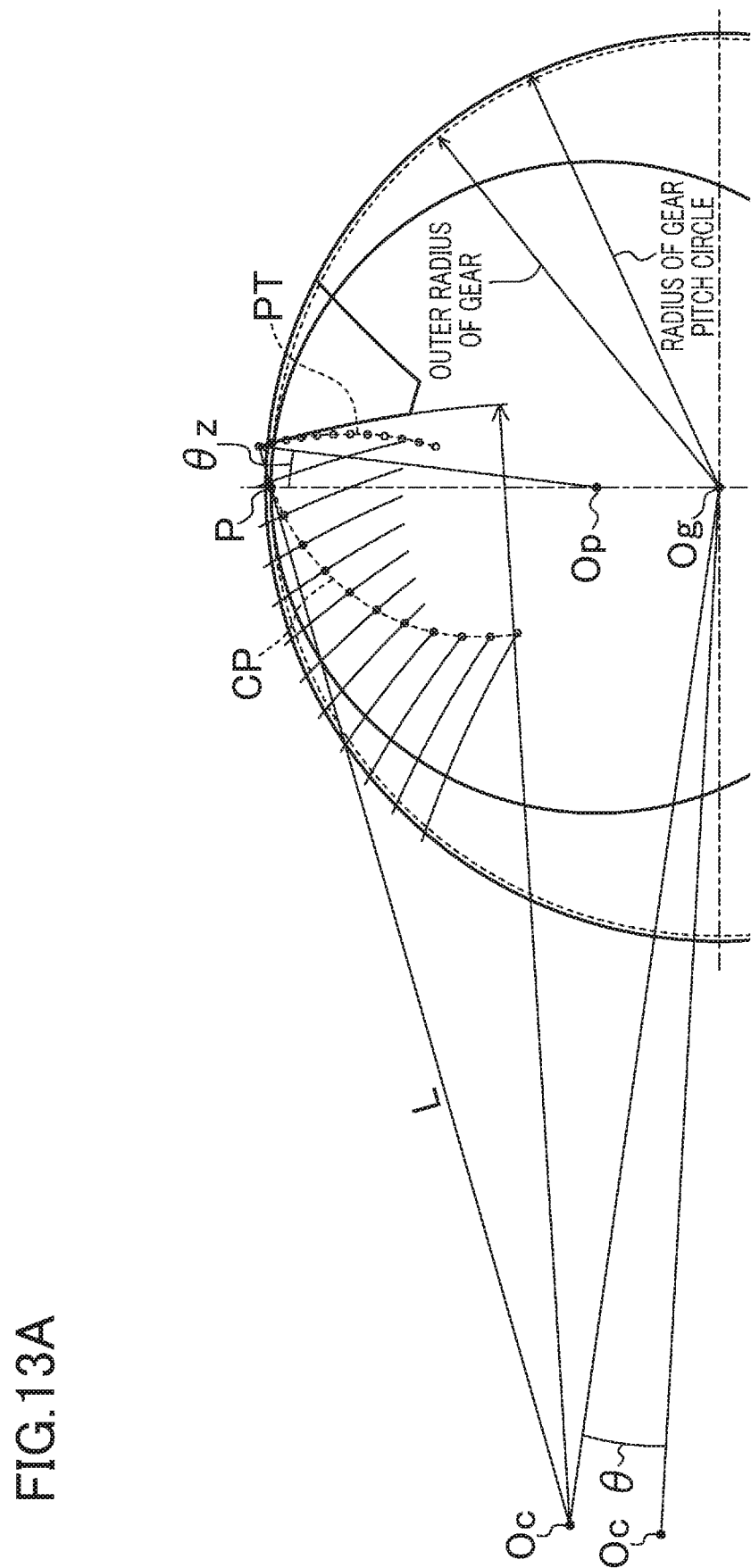
FIG. 13A is a view for explaining specifications for obtaining contact points.
Figure 13B:
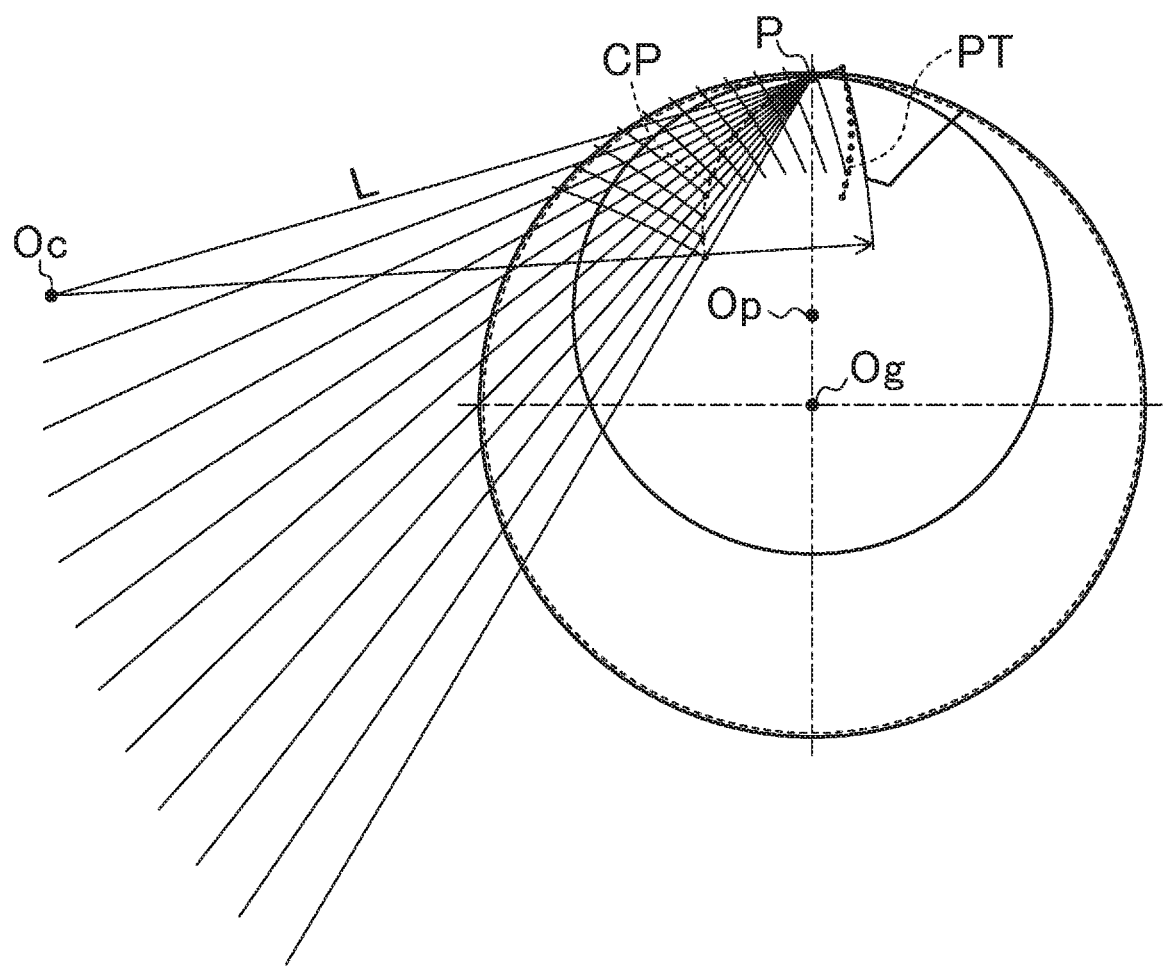
FIG. 13B illustrates a trajectory that contact points between a gear and a pinion draw with the rotation of the gear, and a trajectory of a theoretical tooth surface of the pinion obtained based on the trajectory of the contact points.

As illustrated in FIGS. 13A and 13B, a straight line L, which connects the pitch point P between the pinion 4 and the gear 5 to the Oc of a tooth profile circle of the gear 5 is determined first. Next, the gear 5 is rotated around the rotation center Og of the gear 5 by an angle θ. That is, the center Oc of the tooth profile circle C is rotated around the rotation center Og by the angle θ, and then, another tooth profile circle is drawn around the rotated center. In the same manner, a straight line L is newly drawn.

Intersection point between the newly drawn tooth profile circle C and the straight line L is determined. FIGS. 13A and 13B illustrate the intersection point between the left tooth surface of the gear and the straight line L. Based on the conditions of gear mechanics, this intersection point corresponds to a contact point between the pinion 4 and the gear 5.

Note that the gear 5 rotates in 5-degree increments.

Next, the angle θ is varied to obtain a trajectory CP that the contact points draw. When the pinion 4 and the gear 5 are ideally meshed with each other, the trajectory CP corresponds to the tooth surface of the pinion 4 that moves along with the rotation of the gear 5. Thus, the theoretical tooth surface PT of the pinion 4 is a shape obtained through projection of the contact points onto the pinion 4. Specifically, it can be obtained by rotating the trajectory CP of the contact points in a direction opposite to the rotational direction of the gear 5 around the rotation center Op of the pitch circle of the pinion 4, such that the gear 5 returns to the original position.

At this time, the contact points are returned not by the angle θ, but by an angle θz expressed by the following formula (3) around the rotation center Op.

$$\theta z = \theta \times (m/o) \quad (3)$$

Figure 6:
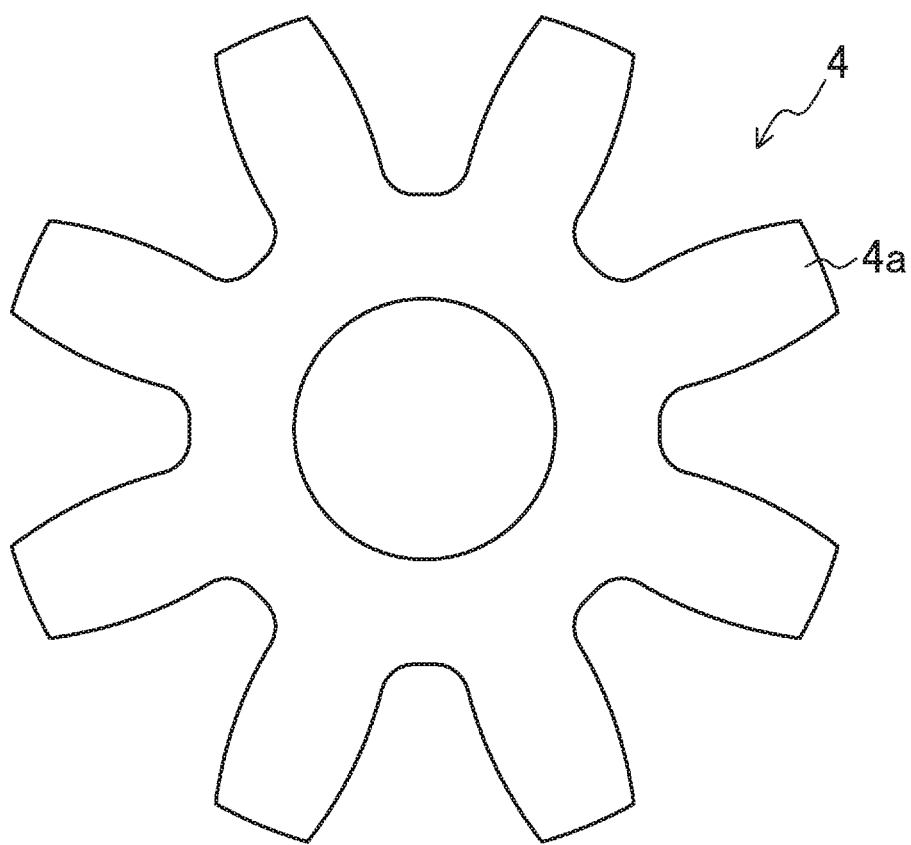
FIG. 6 illustrates a pinion as viewed in an axial direction.

Performing the operations described above enables the theoretical tooth surface of the pinion 4 illustrated in FIG. 6 to be obtained.

However, since the shape obtained in the manner described above is complicated, the theoretical tooth surface is approximated with a plurality of arcs in actual design, and a shape obtained through a combination of the arcs is adopted as the tooth surface of the pinion 4 for practical use.

Performing such approximation can facilitate design and construct the shape of the pinion 4.

As described above, the dedendum of the pinion 4 is approximated by an arc shape connecting adjacent external teeth 4a to one another. Furthermore, the tooth tip has a shape approximate to the dedendum circle of the gear 5.

For design of tooth surface for practical use, it is necessary to take backlash between the pinion 4 and the gear 5 into account, but a detailed description thereof will be omitted from the present specification.

Advantages of this embodiment over the known art will be described below.

Figure 9:
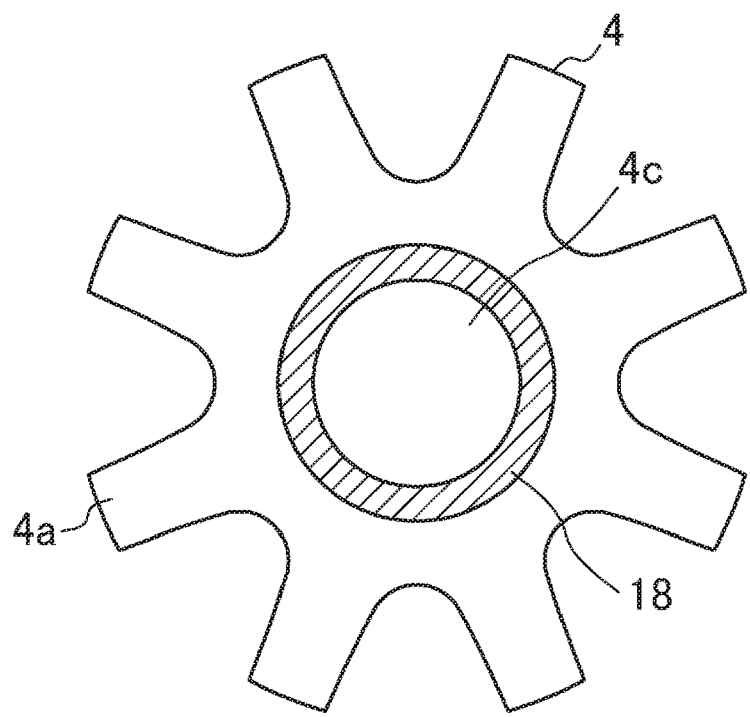
FIG. 9 corresponds to FIG. 6 and illustrates a known pinion.

The gear 5 and the pinion 4 of this embodiment have the shapes illustrated in FIGS. 3 and 6, respectively, and the gear 5 and the pinion 4 of the known art have the shapes illustrated in FIGS. 8 and 9, respectively.

Figure 14A:
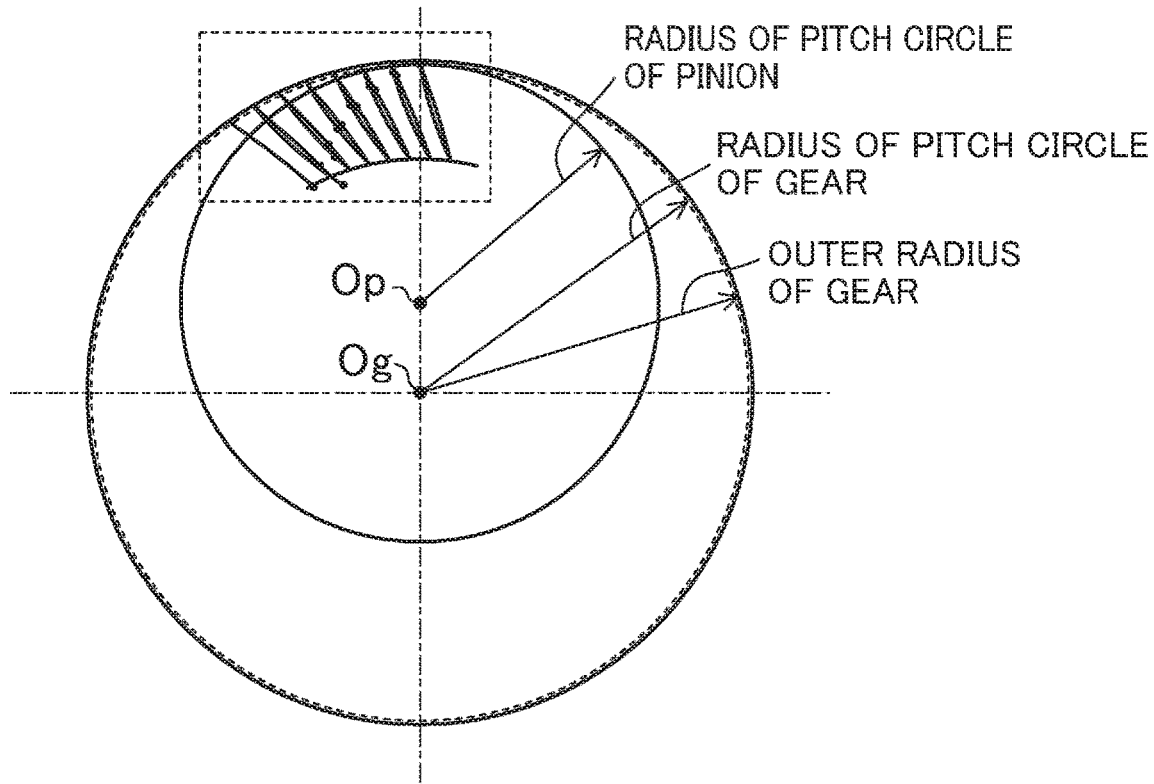
FIG. 14A illustrates a trajectory of contact points according to an embodiment of the present invention and a trajectory of contact points according to the known art when a gear is rotated.
Figure 14B:
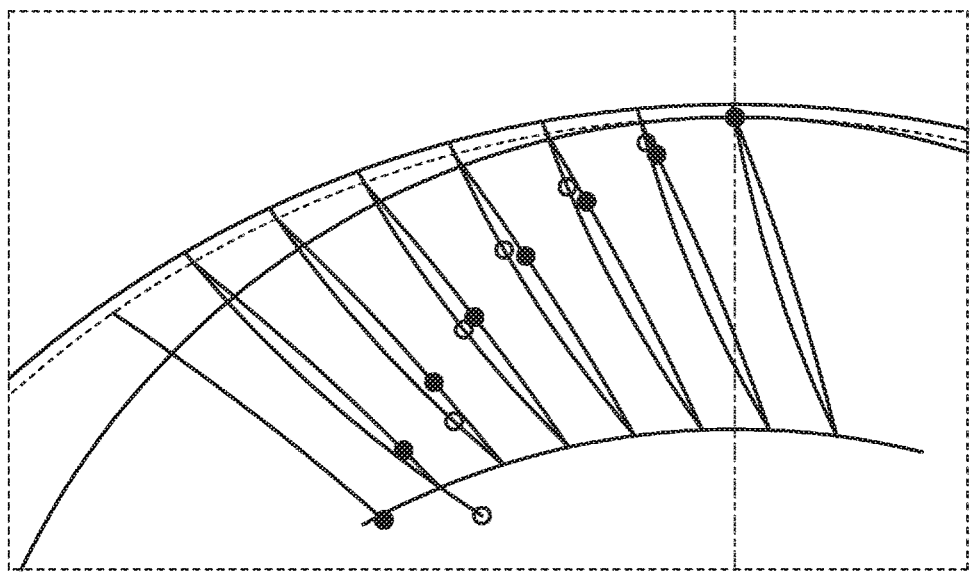
FIG. 14B is an enlarged view of a part of FIG. 14A.

First, as illustrated in FIGS. 14A and 14B, when the gear 5 rotates, the trajectory of contact points (indicated by black circles) of this embodiment curves more smoothly than the trajectory of contact points (indicated by white circles) of the known art. In addition, in this embodiment, a variation of movement distances between the adjacent ones of contact points with respect to the rotation of the gear 5 is also small.

This indicates that in this embodiment, a wide area of the tooth surface of the pinion 4 comes into contact with the gear 5 at an approximately constant speed and smoothly. Accordingly, as compared with the known art, abrasion is unlikely to occur between the pinion 4 and the gear 5, contributing to prolongation of lifetimes of the pinion 4 and the gear 5.

Figure 15:
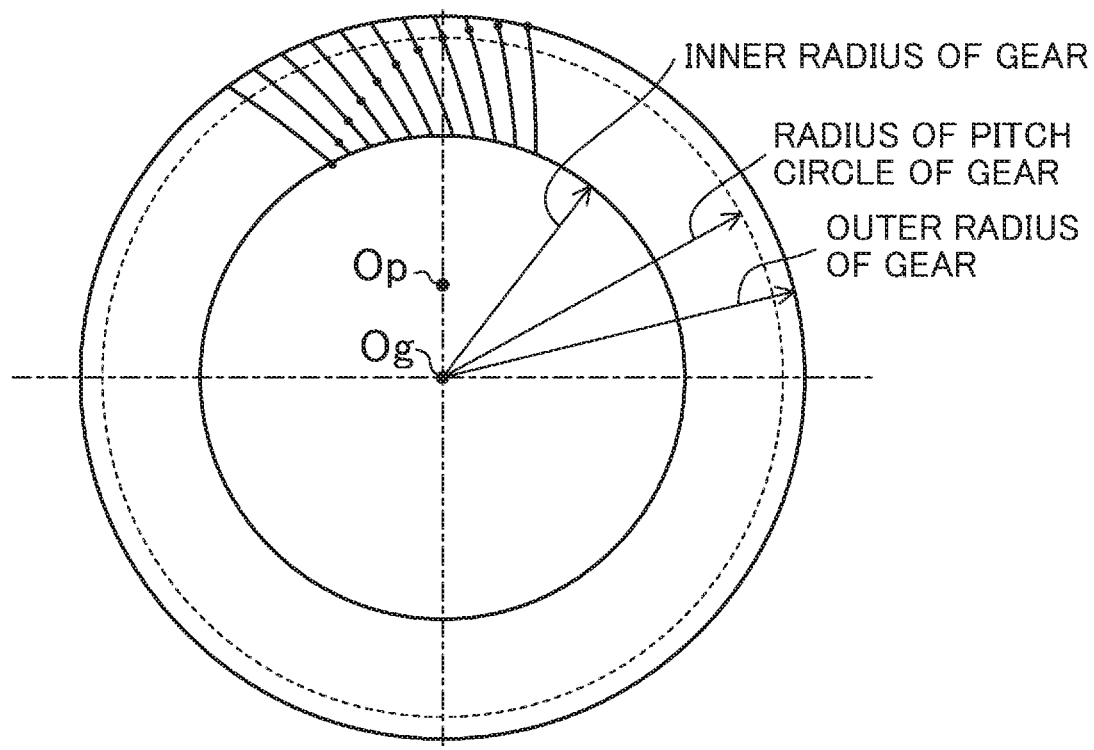
FIG. 15 illustrates a trajectory of contact points between internal teeth of a gear and external teeth of a pinion in a case where the gear is rotated in a clockwise direction or a counterclockwise direction.
Figure 16:
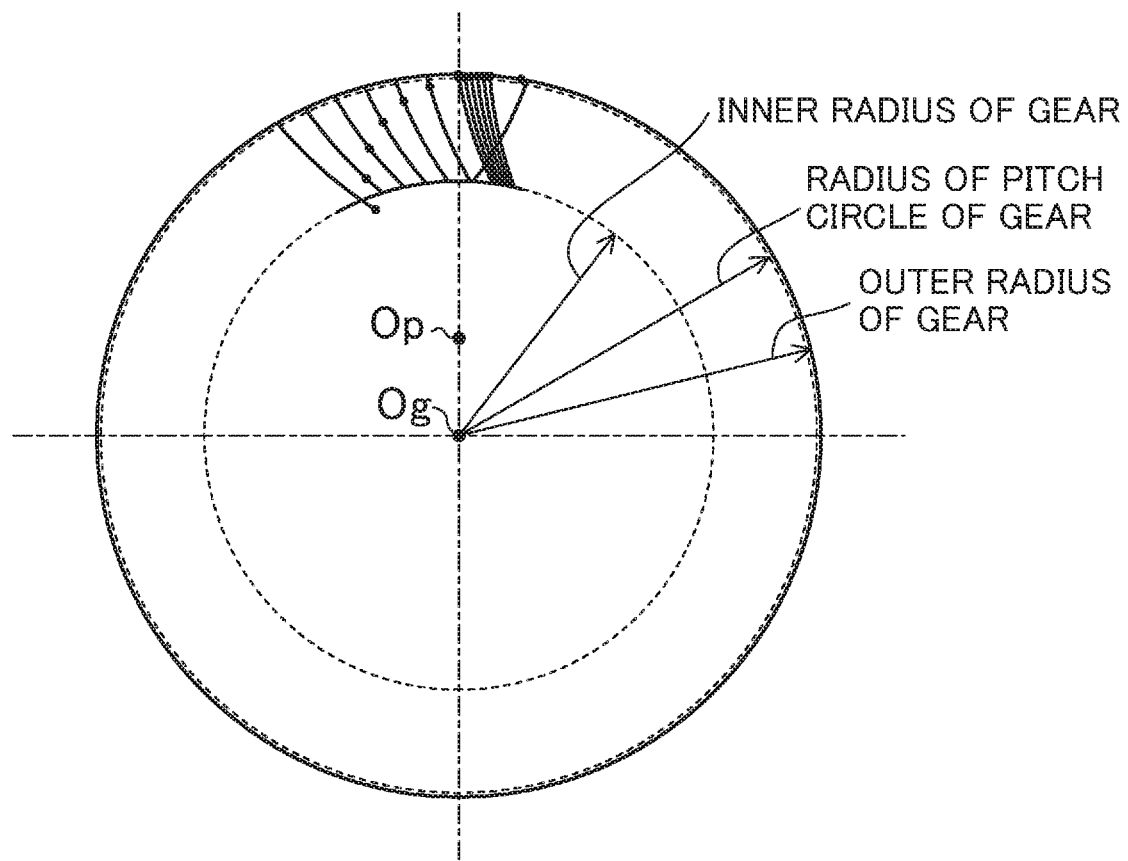
FIG. 16 corresponds to FIG. 15, and illustrates a trajectory of contact points between internal teeth of a gear and external teeth of a pinion according to the known art in a case where the gear is rotated in a clockwise direction or a counterclockwise direction.

Furthermore, when the gear 5 is rotated in the clockwise direction in the known art illustrated in FIG. 16, contact points can reach to a point at a distance which is about 1.012 times as large as the radius of a gear pitch circle. On the other hand, in this embodiment, when the gear 5 is rotated in the clockwise direction, the contact points can reach a point at a distance about 1.037 times as large as the radius of a gear pitch circle, as illustrated in FIG. 15.

Thus, the pinion 4 and the gear 5 of the gear of this embodiment have a larger contact area than those of the known art. This makes it possible to design the gear 5 to have a high ratio between the outer diameter and the inner diameter of the gear 5, that is, a large tooth depth of the gear, enabling an incase of the discharge amount of the pump P.

For example, on an assumption that the internally rotating gear pump of the known art and that of this embodiment are the same in the outer diameter of the gear 5, the radius of the pitch circle, and the distance between the rotation center of the pinion 4 and the rotation center of the gear 5, a comparison between the discharge amount per revolution of the internally rotating gear pump of the known art and the internally rotating gear pump P of this embodiment shows that the discharge amount of the latter is 1.1 times as large as the discharge amount of the former.

As described above, according to this embodiment, the gear 5 is designed to have a tooth surface in an inverted arc shape, while the pinion 4 corresponding to the gear 5 is designed to have a tooth surface corresponding to the trajectory obtained by geometrically converting a trajectory, which the contact points between the pinion 4 and the gear 5 draw with respect to the rotation of the gear 5. These features make it possible to allow the pinion 4 and the gear 5 to come into contact with each other smoothly over wide areas of respective tooth surfaces. This contributes to prolongation of the lifetime of the gears and improves the durability of the entire the pump P.

In this embodiment, the tooth surfaces of the gear 5 is designed such that the inward tooth surfaces of two internal teeth between which five consecutive internal teeth are interposed are positioned on an arc of the same circle. However, an interval between two internal teeth 5a positioned on the arc of the same circle may be appropriately changed according to a combination of the number of teeth of the pinion 4 and the number of teeth of the gear 5.

(Arrangement of Gear Bush, Gear, and Pinion)

In the internally rotating gear pump of the known art, the pinion 4 and the gear 5 are arranged to face each other with a slight gap interposed therebetween when viewed in the direction perpendicular to the rotating shaft 3. This arrangement is made in order to reduce friction between the pinion 4 and the gear 5 while maintaining fluid sealability during the rotation of the pump.

However, the surfaces of the pinion 4 and the gear 5 that face each other may rub against each other when a fluid has such a high viscosity that prevents the fluid from entering the gap above described or when the pump has therein a certain pressure. The surfaces may receive a scratch when the pump is used for a long time.

Furthermore, if a fluid contains solid particles and the like, the surfaces may be scratched depending on the particle size.

A scratch or abrasion on the gear 5 or the pinion 4 may incur the risk of leakage of the fluid through the position of the scratch or the abrasion, and in addition, the risk of the abrasion of or damage to the gear itself. In such a case, it is necessary to exchange at least one of the gear 5 or the pinion 4.

The internally rotating gear pump P according to this embodiment, in which the distance between the gear bush 7 and the pinion 4 is shorter than that between the pinion 4 and the gear 5, solves this problem.

This feature will now be described in detail below.

Figure 17:
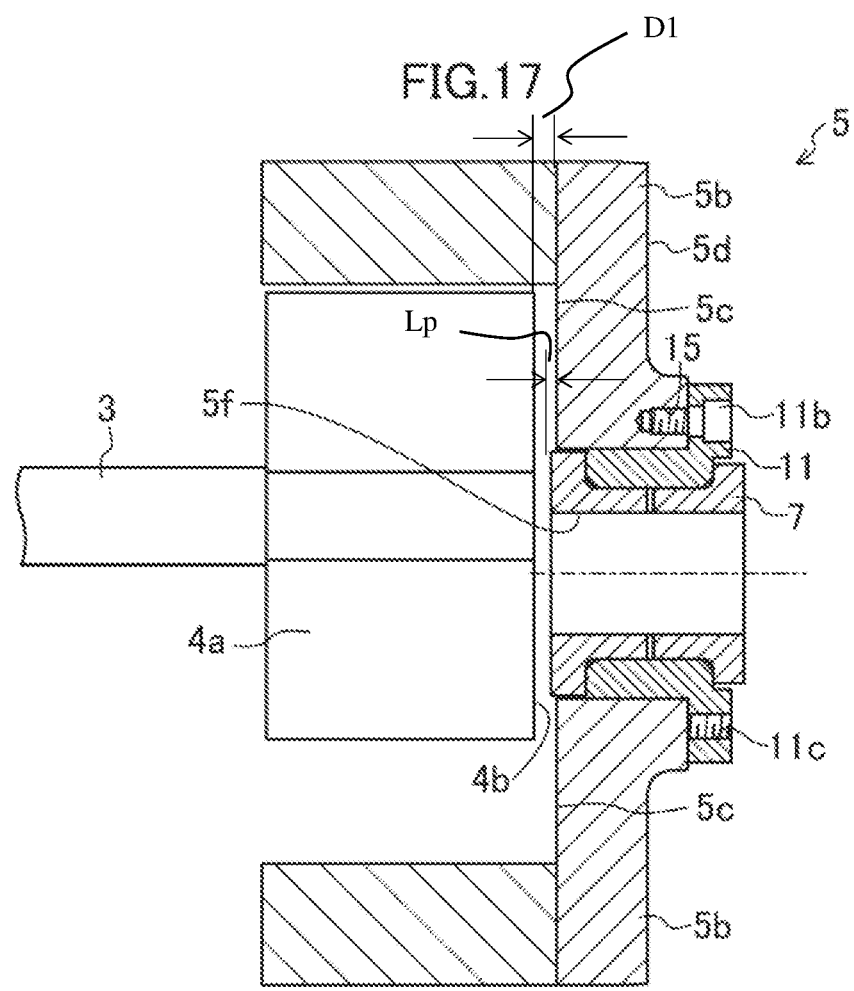
FIG. 17 is an enlarged cross-sectional view of where a gear and a pinion according to a second embodiment of the present invention face each other.

As illustrated in FIG. 17, a predetermined space is provided between the rear surface 4b of the pinion 4 and the front surface 5c of the base 5b, the rear surface 4b facing the base 5b. The gear bush 7 protrudes toward the pinion 4, that is, protrudes forward. In other words, a surface of the gear bush 7, which faces the pinion 4, is closer to the rear surface 4b than the front surface 5c is.

Figure 18:
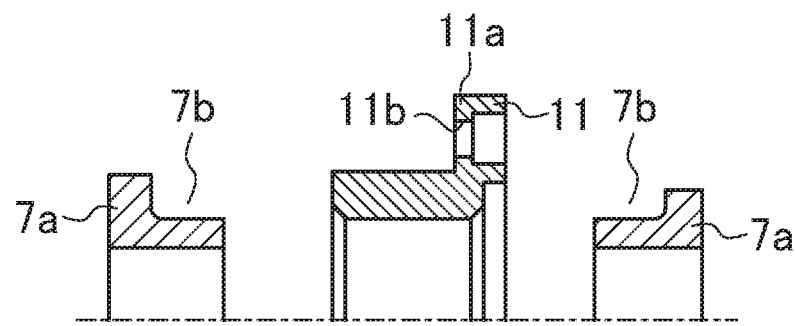
FIG. 18 is a view for explaining a structure for mounting a gear bush to a sleeve.

The gear bush 7 needs to simultaneously receive a force in the direction perpendicular to the rotation axis (hereinafter, referred to as the radial force) and a force in the direction parallel to the rotation axis (hereinafter, referred to as the thrust force). In view of this, as illustrated in FIG. 18, the sleeve 11 has, at its rear end, a flange 11a facing outward, and is in a substantial L-shape in cross section. The flange 11a has a plurality of bolt insertion holes 11b and a plurality of bolt screw holes 11c (see FIG. 20) passing through the flange 11a. The bolt insertion holes 11b and the bolt screw holes 11c are arranged at regular intervals in the circumferential direction. Furthermore, the rear surface 5d of the base 5b of the gear 5 has bolt fastening holes 15 corresponding to the bolt insertion holes 11b.

Furthermore, since the sleeve 11 has the substantial L-shape, the gear bush 7 needs to be inserted from the front and rear of the sleeve 11 as viewed in the direction perpendicular to the rotation axis. For this reason, the gear bush 7 is dividable into two division parts 7a relative to the rotation axis. Furthermore, each division part 7a has, in its outer peripheral surface, a recess 7b extending from an end adjacent to the opposite division part 7a to an intermediate portion in the axial direction of the division part 7a and continuing over the entire periphery. The recess 7b is provided for the purpose of fitting a substantial half part of the sleeve 11. When the two division parts 7a are combined with each other, the two recesses 7b form one annular recess in the outer peripheral surface of the gear bush 7, so that the sleeve 11 is fitted into the annular recess.

Figure 19:
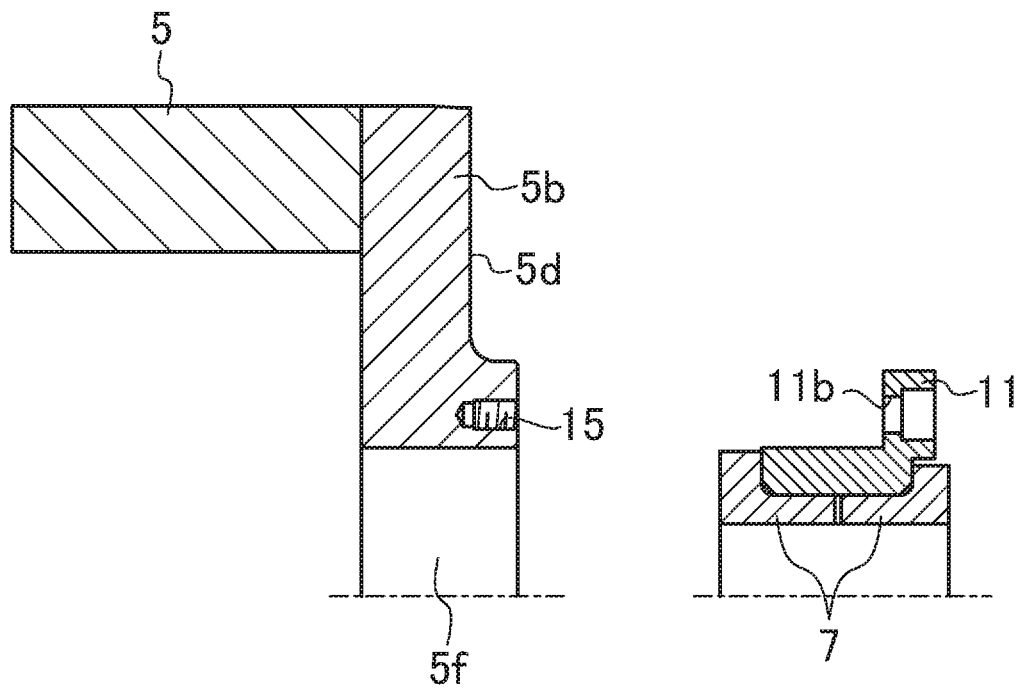
FIG. 19 is a view for explaining a structure for mounting a sleeve to a gear.

As illustrated in FIG. 19, after the two division parts 7a of the gear bush 7 are fitted from both sides of the sleeve 11, the bolt fastening holes 15 are aligned with the bolt insertion holes 11b between the gear 5 and the sleeve 11. The gear bush 7 is fitted into the sleeve 11 by shrink fitting or press fitting.

FIGS. 18 and 19 are each a cross-sectional view of the upper halves of the respective components.

[0103]

Figure 20:
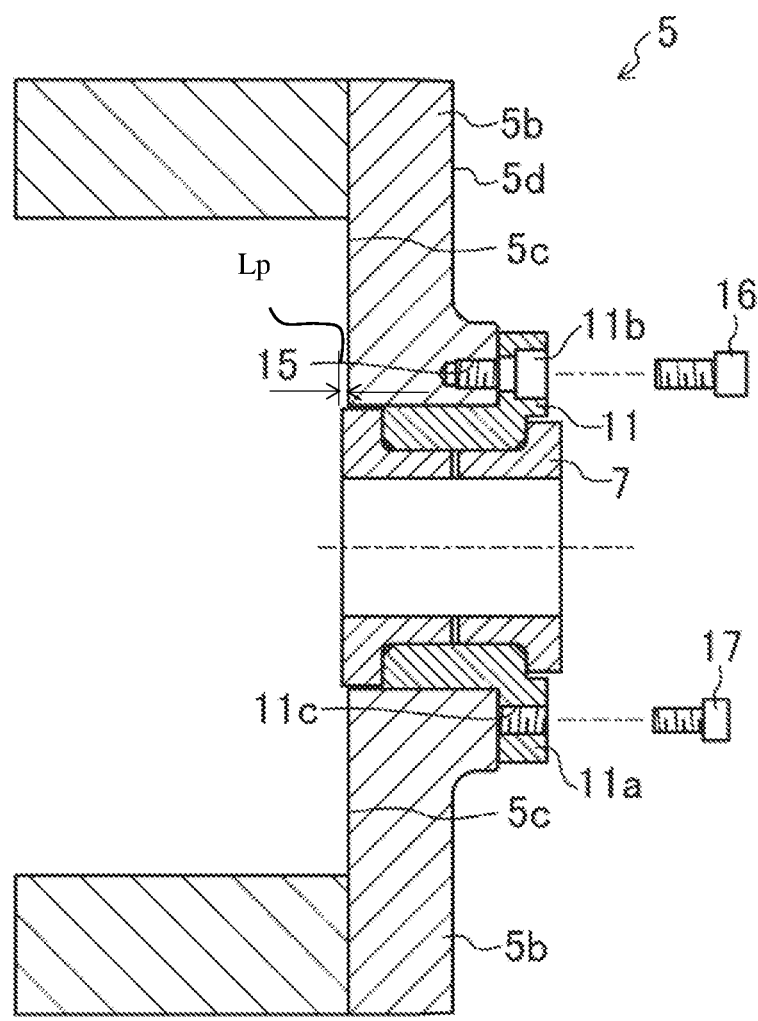
FIG. 20 is a view for explaining a structure for adjusting a protrusion length of a gear bush.

As illustrated in FIGS. 19 and 20, the sleeve 11 and the gear bush 7 are inserted into the mounting hole 5f of the gear 5 while the sleeve 11 has been fitted to the recesses 7b of the two division parts 7a of the gear bush 7, and hexagon socket head bolts 16 are inserted into the bolt insertion holes 11b to be screwed into the bolt fastening holes 15, thereby fastening the sleeve 11 and the two division parts 7a of the gear bush 7.

At this time, a protrusion length Lp of the gear bush 7 relative to the front surface 5c of the base 5b is adjusted and determined with the hexagon socket head bolts 16 and machine bolts 17 screwed into the bolt screw holes 11c.

The machine bolts 17 are screwed into the sleeve 11, so that ends of the machine bolts 17 contact with and push the base 5b of the gear 5. At this time, a gap is created between the sleeve 11 and the base 5b of the gear 5. A shim (not illustrated) is inserted into this gap, the hexagon socket head bolts 16 are fastened to fix the position of the whole, and the protrusion length Lp of the gear bush 7 is adjusted.

Although not illustrated in the drawings, the bolt insertion holes 11b are not equal in number to the bolt screw holes 11c, and the number of the bolt screw holes 11c is smaller than the number of the bolt insertion holes 11b.

In this embodiment, the protrusion length Lp of the gear bush 7 relative to the front surface 5c of the gear base 5b is about 0.2 mm and the distance D1 between the front surface 5c of the gear base 5b and the rear surface 4b of the pinion 4 is about 0.47 mm. However, the present invention is not particularly limited thereto and the protrusion length Lp of the gear bush 7 and the distance a1 are appropriately changed according to the type or temperature of a fluid to be transferred, the size of the pump, the assembling precision of the pump, and the like.

As described above, the gear bush 7 is allowed to protrude forward by a predetermined length with respect to the gear base 5a, so that the surfaces of the gear 5 and the pinion 4 facing each other, namely, the front surface 5c of the gear 5 and the rear surface 4b of the pinion 4 are separated from each other by a distance a1 larger than the protrusion length Lp.

This feature makes it possible to substantially prevent the front surface 5c of the gear 5 and the rear surface 4b of the pinion 4 from contacting with each other and the facilitate the entry of a fluid between these surfaces facing each other. As a result, scratch and abrasion of the pinion 4 or the gear 5 can be reduced. Furthermore, the fluid sealability can be maintained between the gear bush 7 and the rear surface 4b of the pinion 4.

These features can substantially prevent fluid leakage in the pump P and reduce the exchange frequency of the pinion 4 and the gear 5, contributing to improving the durability of the pump P.

Figure 10:
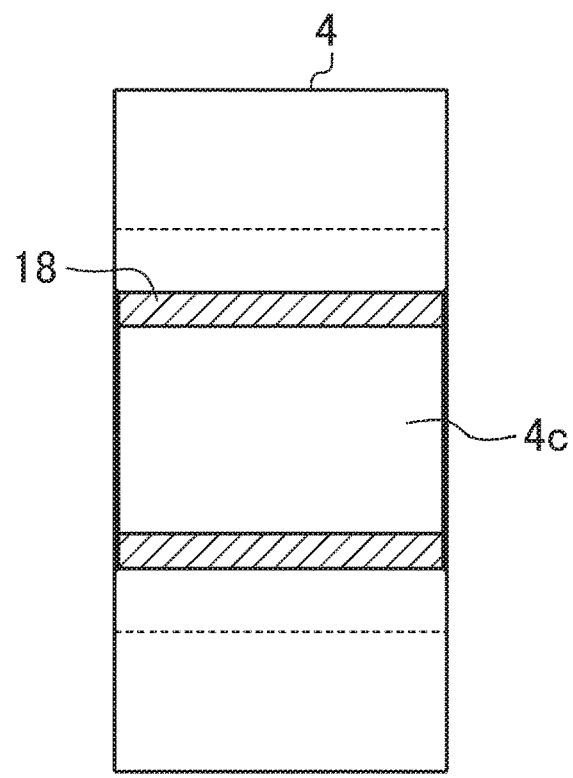
FIG. 10 is a cross-sectional view of a known pinion.

In the gear drive system, as illustrated in FIGS. 9 and 10, a pinion bush 18 is fitted in the mounting hole 4c of the pinion 4.

In such a case, since the pinion bush 18 is fixed to the pinion 4 and the pinion 4 is interposed between the gear 5 and the casing cover 9 so as to be fixed, it is difficult to cause the pinion bush 18 to protrude by a small length.

In contrast, according to this embodiment, as illustrated in FIG. 1A, a space can be provided between the gear 5 and the end cover 10, and a margin can be ensured along the rotation axis, the margin allowing the gear bush 7 and the sleeve 11 to be moved. These features make it possible to easily perform fine adjustment of the position of the sleeve 11 having the gear bush 7 attached thereto.

Furthermore, when the gear bush 7 is abraded, it is possible to cope with the abrasion of the gear bush 7 by performing position re-adjustment. Thus, an exchange cycle of the gear bush 7 can be prolonged, and thus the lifetime of the gear bush 7 is prolonged.

Note that in the first and second embodiments, it is preferable to use, as a constituent material for the gear bush 7, a gunmetal-based material such as a bronze casting, a carbon-based material, a silicon carbide, or a composite material of a carbon-based material and a silicon carbide.

Usually, the pinion 4 and the gear 5 are each made of an iron-based material such as an FC-based material, an S45C-based material, and a stainless-based material in many cases. Forming the gear bush 7 using any of the above-described materials makes it less likely that the pinion 4 is scratched even if the gear bush 7 and the rear surface 4b of the pinion 4 made of the iron-based material come into contact with each other. Thus, the lifetime of the pinion 4 can be prolonged.

Furthermore, even if the gear bush 7 is abraded, the position of the gear bush 7 can be returned to the originally-designed position by re-adjusting the position of the sleeve 11 as described above. In addition, the gear bush 7 is easy to exchange.

Note that the constituent material for the gear bush 7 is not particularly to the materials described above, and can be appropriately changed according to the type of a fluid to be transferred.

INDUSTRIAL APPLICABILITY

The internally rotating gear pump of the present invention, which can reduce a load applied to a gear and a slide bearing during rotation and has excellent durability, is useful as a pump for sucking and discharging a fluid.

DESCRIPTION OF REFERENCE CHARACTERS

P Internally Rotating Gear Pump
1 Casing
3 Rotating Shaft
4 Pinion
4a External Teeth of Pinion
5 Gear
5a Internal Teeth of Gear
5b Base of Gear
6 Gear Pin
7 Gear Bush
8 Crescent-Shaped Guide
11 Sleeve
12 Suction Port
13 Discharge Port
CP Trajectory of Contact Points between Gear and Pinion
Op Rotation Center of Pinion
Og Rotation Center of Gear

The invention claimed is:

1. An internally rotating gear pump in which a pinion having external teeth and a gear arranged eccentrically to the pinion and having internal teeth meshed with the external teeth of the pinion are housed in a casing having a suction port and a discharge port, the internally rotating gear pump being configured to suck a fluid and discharge the fluid by rotating the pinion and the gear while the internal teeth and the external teeth are meshed with each other, the internally rotating gear pump comprising:
 a rotating shaft rotatably supported in the casing and rotationally driven by an external actuator; and
 a gear pin fixedly mounted to the casing, wherein
 the pinion is coupled to the rotating shaft such that the pinion and the rotating shaft are rotationally driven in an integrated manner when the rotating shaft is driven, and
 the gear is rotating around the gear pin and supported on the gear pin via a gear bush functioning as a slide bearing between the gear pin and the gear.

2. The internally rotating gear pump of claim 1, wherein the gear has the internal teeth provided on an outer peripheral part of a gear base of the gear,
 the gear bush protrudes toward the pinion by a predetermined protrusion length from the gear base, and
 the gear base and the pinion are arranged at a distance from each other, the distance being longer than the protrusion length.

3. The internally rotating gear pump of claim 2, wherein the gear base is provided with a sleeve on a side facing away from the pinion, the sleeve usable for adjusting a position of the gear bush along a rotation axis of the rotating shaft.

4. The internally rotating gear pump of claim 2, wherein the pinion includes an iron-based material, and
 the gear bush consists of any one of a gunmetal-based material, a carbon-based material, a silicon carbide, or a composite material of a carbon-based material and a silicon carbide.

5. The internally rotating gear pump of claim 1, wherein the pinion includes an iron-based material, and
 the gear bush consists of any one of a gunmetal-based material, a carbon-based material, a silicon carbide, or a composite material of a carbon-based material and a silicon carbide.

6. The internally rotating gear pump of claim 1, wherein the gear bush is formed in a hollow cylindrical shape and the gear pin is formed in a columnar shape, and
 the gear bush is fitted onto the gear pin.

7. The internally rotating gear pump of claim 6, wherein a whole of an inner peripheral surface of the gear bush is in contact with an outer peripheral surface of the gear pin.

* * * * *